United States Patent
Dror et al.

(10) Patent No.: US 9,000,385 B2
(45) Date of Patent: Apr. 7, 2015

(54) METHOD AND APPARATUS FOR ACQUIRING RADIATION DATA

(75) Inventors: Uzi Dror, Haifa (IL); Alexander Fishler, Haifa (IL); Jean-Paul Bouhnik, Zichron Yaacov (IL); Ira Blevis, Zichron Yaakov (IL)

(73) Assignee: General Electric Company, Schenectady, NY (US)

( * ) Notice: Subject to any disclaimer, the term of this patent is extended or adjusted under 35 U.S.C. 154(b) by 689 days.

(21) Appl. No.: 12/649,840

(22) Filed: Dec. 30, 2009

(65) Prior Publication Data

US 2011/0155899 A1    Jun. 30, 2011

(51) Int. Cl.
*G01T 1/17* (2006.01)
*G01T 1/24* (2006.01)

(52) U.S. Cl.
CPC ............... *G01T 1/171* (2013.01); *G01T 1/247* (2013.01); *G01T 1/249* (2013.01)

(58) Field of Classification Search
CPC ............ G01T 1/71; G01T 1/24; G01T 1/247; G01T 1/171; G01T 1/249; G01T 1/17
USPC ............... 250/363.04, 370.09, 363.01, 252.1, 250/370.06, 307.01, 370.15, 370.01; 378/4, 378/19, 5, 91
See application file for complete search history.

(56) References Cited

U.S. PATENT DOCUMENTS

| | | | |
|---|---|---|---|
| 3,657,535 A | 4/1972 | Bjarngard et al. | |
| 4,591,984 A * | 5/1986 | Mori | 250/363.07 |
| 7,139,362 B2 | 11/2006 | Heismann et al. | |
| 7,263,167 B2 | 8/2007 | Walter et al. | |
| 7,583,790 B2 | 9/2009 | Hoffman et al. | |
| 8,237,128 B2 | 8/2012 | Steadman et al. | |
| 8,243,874 B2 | 8/2012 | Carmi | |
| 8,618,471 B2 | 12/2013 | Steadman et al. | |
| 2005/0123090 A1 | 6/2005 | Heismann et al. | |
| 2007/0023669 A1* | 2/2007 | Hefetz et al. | 250/370.14 |
| 2007/0076848 A1 | 4/2007 | Walter et al. | |
| 2007/0279037 A1 | 12/2007 | Jouve et al. | |
| 2008/0260094 A1* | 10/2008 | Carmi | 378/19 |
| 2009/0039273 A1* | 2/2009 | Tkaczyk et al. | 250/370.06 |

FOREIGN PATENT DOCUMENTS

| | | |
|---|---|---|
| JP | 01118393 U | 8/1989 |
| JP | 2004325183 A | 11/2004 |
| JP | 2005249580 A | 9/2005 |
| JP | 2005526556 A | 9/2005 |

(Continued)

OTHER PUBLICATIONS

Castelletto, S.A., et al; "*Reduced Deadtime and Higher Rate Photon-Counting Detection using a Multiplexed Detector Array*"; v.3.3 released Jul. 2005; Journal of Modern Optics; 2 pgs.

(Continued)

*Primary Examiner* — Yara B Green
(74) *Attorney, Agent, or Firm* — Dean Small; The Small Patent Law Group, LLC

(57) ABSTRACT

Method and apparatus for extending a count rate capability of a detector array. The method includes receiving photons at a detector array, counting the photons that are above a first energy threshold using a first counter, counting the photons that are above a different second energy threshold using a second counter, and calculating a pile-up estimate using the photon counts from the first and second counters.

17 Claims, 5 Drawing Sheets

(56) References Cited

FOREIGN PATENT DOCUMENTS

| JP | 2006101926 A | 4/2006 |
|---|---|---|
| JP | 2007524104 A | 8/2007 |
| JP | 2010500119 A | 1/2010 |
| JP | 2010507797 A | 3/2010 |
| JP | 2010513860 A | 4/2010 |
| WO | 2007/049168 A2 | 5/2007 |

OTHER PUBLICATIONS

PCT International Search Report and Written Opinion, from corresponding PCT/US2010/055595, Oct. 20, 2011.
Unofficial English Translation of Japanese Office Action issued in connection with corresponding JP Application No. 2012-547074 on Nov. 4, 2014.

* cited by examiner

METHOD AND APPARATUS FOR ACQUIRING RADIATION DATA

BACKGROUND OF THE INVENTION

The subject matter disclosed herein relates generally to imaging systems, and more particularly, embodiments relate to systems and methods for acquiring photon count information using detectors of the imaging systems.

Conventional imaging systems, such as a Computed Tomography (CT) imaging system, are used to scan an object of interest to acquire image information. Typically, the imaging systems include an X-ray source that is configured to emit X-rays toward the object. A detecting device, such as an array of radiation detectors, is positioned on the other side of the object to detect the X-rays transmitted through the object.

CT imaging systems may acquire the imaging information by operating in a current mode. When operating in the current mode, the detector converts radiographic energy into current signals that are integrated over a time period, then measured and ultimately digitized. A drawback of such detectors however is their inability to provide data or feedback as to the number and/or energy of photons detected. Accordingly, CT imaging systems are also configured to operate in a photon-counting mode. While operating in the photon-counting mode, some CT imaging systems may not be able to count x-rays at x-ray photon flux rates typically encountered with conventional CT systems. For example, the count-rate capability of a solid-state detector, such as a Cadmium Zinc Telluride (CZT) detector or a Cadmium Telluride (CdTe) detector, operating in the photon-counting mode, is limited by the pulse shaping capability of the detector scintillators. For example, the maximum photon count-rate for a conventional CZT detector is limited to approximately $1/e^T$ per electronics channel, where T is the dead time. Dead time occurs when a photon impacts a detector crystal and the detector is busy processing or counting the photon.

Accordingly, when some CT imaging systems are operating in the photon-counting mode, detector saturation, or detector pile-up, may occur. Pile-up also affects light curves, suppressing high-count rates. In other words, these detectors typically saturate at relatively low X-ray flux level thresholds. Above these thresholds, the detector response is not predictable or has degraded dose utilization. That is, once a pixel is saturated (corresponding to a bright spot in the generated signal), additional radiation will not produce useful detail in the image.

BRIEF DESCRIPTION OF THE INVENTION

In one embodiment, a method for extending a count rate capability of a detector array is provided. The method includes receiving photons at a detector array, counting the photons that are above a first energy threshold using a first counter, counting the photons that are above a different second energy threshold using a second counter, and calculating a pile-up estimate using the photon counts from the first and second counters.

In another embodiment, a detector array is provided. The detector array includes a plurality of solid state crystals forming a matrix of pixels and having a radiation detection field for sensing radiation events and a photon-counting device coupled to at least one of the plurality of pixels. The photon-counting device configured to receive photons at a detector array, count the photons that are above a first energy threshold using a first counter, count the photons that are above a different second energy threshold using a second counter, and calculate a pile-up estimate using the photon counts from the first and second counters.

In a further embodiment, a computer readable medium is provided. The computer readable medium is programmed to instruct a computer to count the photons that are above a first energy threshold using a first counter, count the photons that are above a different second energy threshold using a second counter, and calculate a pile-up estimate using the photon counts from the first and second counters.

DETAILED DESCRIPTION OF THE INVENTION

Figure 1:
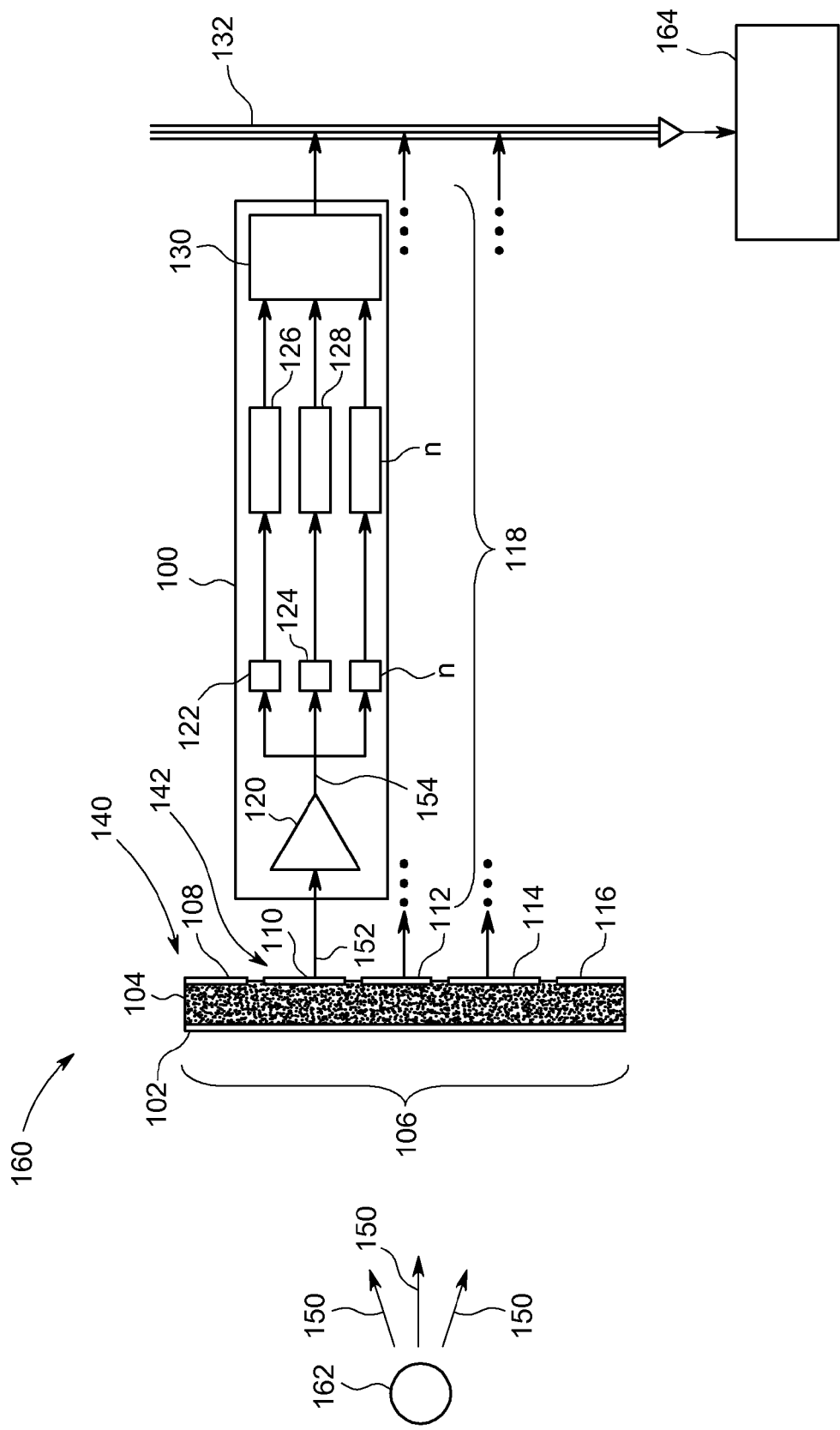
FIG. 1 is a schematic illustration of an exemplary photon-counting device formed in accordance with various embodiments of the present invention.

The foregoing summary, as well as the following detailed description of certain embodiments of the present invention, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or a block of random access memory, hard disk, or the like). Similarly, the programs may be stand alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Also as used herein, the phrase "reconstructing an image" is not intended to exclude embodiments of the present invention in which data representing an image is generated, but a viewable image is not. Therefore, as used herein the term "image" broadly refers to both viewable images and data representing a viewable image. However, many embodiments generate, or are configured to generate, at least one viewable image.

FIG. 1 is a schematic illustration of an exemplary photon-counting device 100 that may be used with an exemplary detector array 160 that is configured to receive x-rays from an exemplary radiation source 162. The x-ray source 162 may be, for example, configured to output x-rays which impinge on the detector array 160. Moreover, the detector array 160 may be a solid-state detector, such as a Cadmium Zinc Telluride (CZT) detector or a Cadmium Telluride (CdTe) detector, that includes a photon count-rate capability In one embodiment, the photon-counting device 100 may be a separate component that is coupled to the detector array 160. In the exemplary embodiment, the photon-counting device 100 is formed integrally with the detector array 160. The photon-counting device 100 is configured to perform photon-counting and also provide a measurement of the energy level of each x-ray detected. The detector array 160 includes a common cathode 102 that is formed on one side of the crystals 104 and forms a detection field 106. A plurality of pixel anodes 108 . . . 116 are formed on a second side of the crystals 104. The pixel anodes 108-116 may form a matrix of rows and columns, wherein each pixel anode 108-116 is a location of a pixel. Therefore, the combination of the cathode 102, the crystal 104, and the anode 108 form a single pixel 140. The combination of the cathode 102, the crystal 104, and the anode 110 form another pixel 142, etc. The matrix of crystals 104 may be equal or different sizes, such as 16×16 pixels or 8×18 pixels, wherein each pixel is, for example, 2 mm×2 mm or 2 mm×3 mm.

In the exemplary embodiment, a photon-counting device is coupled to the output of each pixel. For example, as shown in FIG. 1, the photon-counting device 100 is coupled to the output of the pixel 142. Another photon-counting device (not shown) is coupled to the output of pixel 140, etc. In the exemplary embodiment each pixel on the detector array 160 is coupled to a respective photon-counting device. More specifically, a photon-counting device 100 is coupled in communication with each of the pixel anodes 108-116, forming a dedicated pixel data channel 118 associated with each pixel. The photon-counting device 100 may be an application specific integrated circuit (ASIC) or other electronic device or devices. Optionally, the photon-counting device 100 may be implemented as a set of instructions on the computer 164. Although a single photon-counting device 100 is illustrated in FIG. 1 as being interconnected with a single pixel anode 110, it should be realized that the photon-counting device may be connected to each of the pixel anodes 108-116. Optionally, the photon-counting device 100 may be interconnected with more than one pixel anode 108-116 and include separate processing circuitry and/or capability for each pixel anode 108-116. Moreover, the photon-counting device 100 may receive signals from a subset of pixels from an area of the detector array 160, such as an area having 16×16 pixels. Multiple ASICs may comprise multiple photon-counting devices 100 providing several (e.g. 128) channels, thus providing 128 pixel data channels 118 for receiving data from 128 pixels. The ASICs are connected to the crystal 104, optionally using a carrier printed circuit board (PCB). Optionally, the photon-counting device 100 may be implemented using individual components performing equivalent functions.

Referring again to FIG. 1, in the exemplary embodiment, the photon-counting device 100 includes at least one preamplifier 120 that is coupled to and receives information from the anode 110. The photon-counting device 100 also includes a plurality of threshold analyzers 122, 124 . . . n that are coupled to the preamplifier 120, and a plurality of counters 126, 128 . . . n that are coupled to a respective threshold analyzer 122, 124 . . . n. In the exemplary embodiment, the photon-counting device includes n threshold analyzers that are each coupled to a respective counter 126. As such, the photon-counting device 100 includes n counters and n threshold analyzers. The photon-counting device 100 further includes a multiplexer 130 that reads the count data from the counters 124 . . . n and a readout bus 132 that transmits information received from the multiplexer 130 to the computer 164. The operation of the photon-counting device 100 will be explained in more detail with respect to FIG. 2

Figure 2:
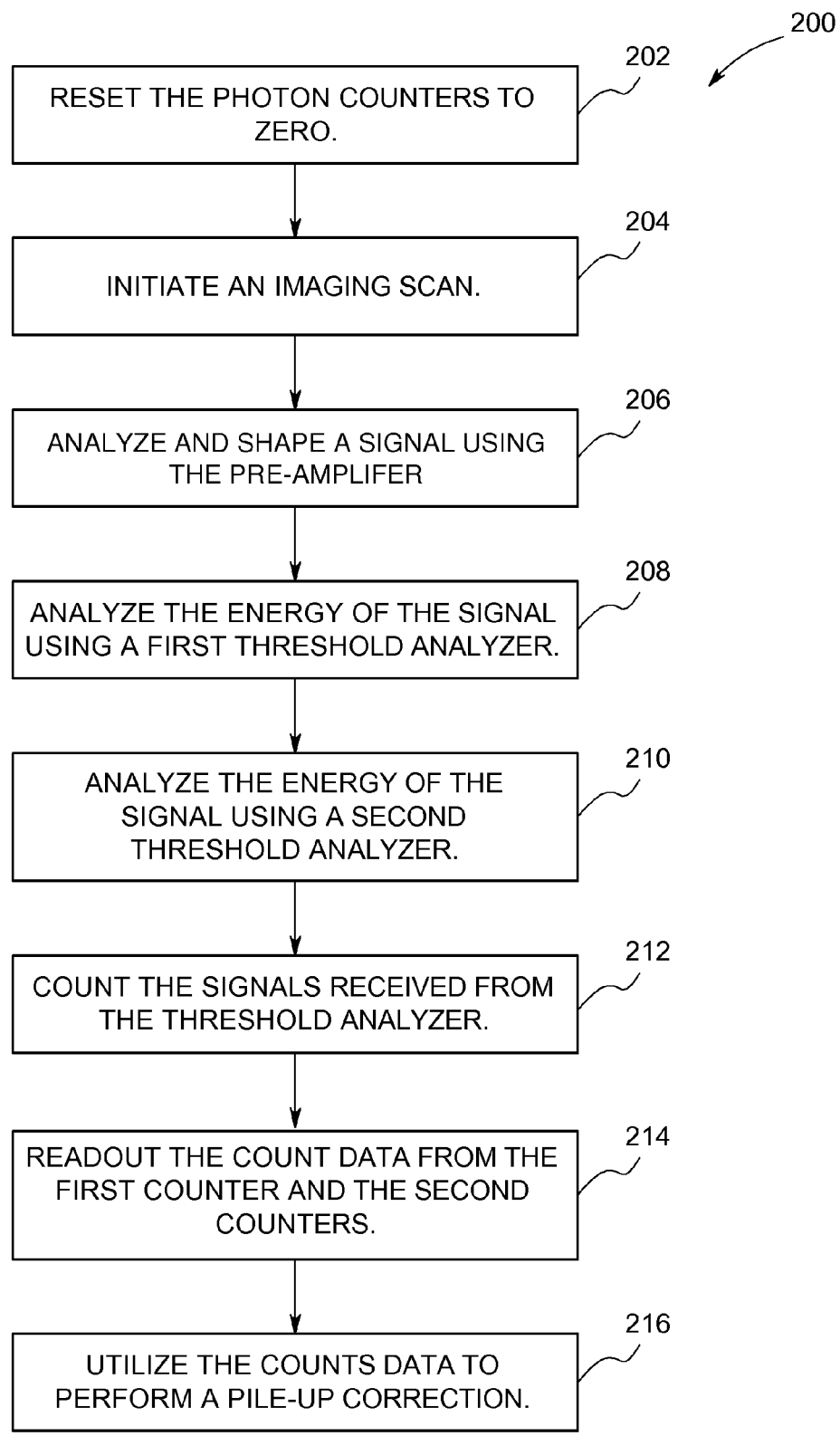
FIG. 2 is a flowchart of an exemplary method for determining event counts in accordance with various embodiments of the present invention.

FIG. 2 is a flowchart illustrating an exemplary method 200 for determining event counts using photon count information acquired from an imaging system detector, such as the detector array 160. In one embodiment, the method 200 may be used during a scanning procedure. In the exemplary embodiment, the method 200 is performed during an imaging system calibration procedure. Moreover, the photon-counting device 100 described above may perform portions of the method 200. Optionally, the method 200 may be implemented as a set of instructions installed on a computer. Moreover, in the exemplary embodiment, the method 100 is utilized with a detector array, e.g. detector array 160, that is operating in the photon-counting mode.

At 202, the counters 122 . . . n are set to zero to reflect that zero photons have been acquired. At 204, an imaging scan is initiated to generate a plurality of x-rays 150 shown in FIG. 1. In operation, the x-rays 150 impinging on the detector array 160 are converted to electrical signals by the detector pixels. The signals generated by the detector array 160 are then transmitted to, and utilized by, the photon-counting device 100 to, for example, calibrate a medical imaging system. Moreover, the method 200 determines a pile-up correction and then applies the pile-up correction to improve the count-rate capability of the detector array.

In the exemplary embodiment, to calibrate the detector array 160, the x-rays are emitted from the x-ray source 162. For example, referring again to FIG. 1, after the scan is initiated at 204 a plurality of radiation events, such as defined by x-rays 150, are transmitted from the x-ray source 162 and absorbed at a pixel location, e.g. pixel 142, causing a signal 152 at the pixel anode 110 to be generated. The signal 152 represents a single count. Accordingly, the signal 152 may represent the flux energy of a single x-ray 150 or may represent the flux energy of multiple x-rays 150. The pixel anode 110 produces the signal 152, which is sent to the pre-amplifier 120 for amplification. The pre-amplifier 120 may be within the photo-counting device 100 as illustrated in FIG. 2 or may be a separate component. At 206, the pre-amplifier 120 amplifies and shapes the signal 152. An amplified signal 154 having at least an energy component and a pulse duration component indicative of the signal 152 is then passed to the threshold analyzers 122,124, . . . , n.

At 208, the threshold analyzer 122 analyzes the energy E of the signal 152. The threshold analyzer 122 analyzes the signal 152 based on a first threshold $T_1$. In the exemplary embodiment, the first threshold $T_1$ is approximately 40 keV. Accordingly, any x-ray having an energy that is equal to or exceeds the threshold $T_1$ is counted by a counter as discussed in more detail below.

At 210, the threshold analyzer 124 analyzes the energy E of the signal 152. The threshold analyzer 124 also analyzes the signal 152 based on a second different threshold $T_2$. In the exemplary embodiment, the second threshold $T_2$ is greater than the first threshold $T_1$. For example, the second threshold $T_2$ may be approximately 100 keV. Accordingly, during operation, the first threshold analyzer 122 analyzes each signal received from the pixel 142 and determines if the energy level of the signal is greater than the threshold $T_1$. Moreover, analyzes each signal received from the pixel 142 and determines if the energy level of the signal is greater than the threshold $T_2$. In this manner, each x-ray is processed and counted separately, concurrently, and approximately simultaneously by the photon-counting device 100.

At 212, the counters count the x-rays received from their respective threshold counters. During operation, the threshold analyzer 122 sends any x-rays having a flux energy that exceeds the first threshold $T_1$ to the first counter 126 and the threshold analyzer 124 sends any x-rays having a flux energy that exceeds the second threshold $T_2$ to the second counter 128. Therefore, if the flux energy of the signal 152 exceeds the first threshold $T_1$ the signal 152 is counted by the first counter 126. Moreover, if the energy level of the signal 152 exceeds the second threshold $T_2$ the signal 152 is also counted by the second counter 128.

More specifically, when an object or subject is being imaged, the detector array 160 is more sensitive to counts in certain areas. As the counts recorded by the detector array 160 increases the sensitivity of the detector array 160 decreases. For example, assuming a patient is being scanned, the quantity of counts or x-rays detected by the detector array 160, and thus the flux energy recorded by the detector array 160, are less in areas where the patient is more dense. Because, the count-rate and flux energy is reduced at locations where the patient is positioned, the detector array 160 is more sensitive at this location. However, in scan areas where the detector array 160 is imaging air, for example, when there is no portion of the patient positioned between the x-ray source 162 and the detector array 160, the count-rate is substantially increased and thus the detector array 160 is less sensitive at this area. As a result, the first threshold is utilized to identify counts having lower energy and the second threshold is utilized to identify counts having higher energy.

Accordingly, the threshold analyzers 122 . . . n each analyze the energy E of the x-rays 150 with respect to their respective threshold. In one embodiment, the second threshold $T_2$ is set at a value that is greater than or equal to a maximum corrected value of the detector array 160. The maximum corrected value is typically the value at which the pixel experiences saturation. In another embodiment, the second threshold $T_2$ may be set at a value that is within a predetermined amount of the maximum corrected value, for example, approximately 80% of the maximum corrected value. It should be realized that although method 200 is described with respect to using two thresholds, the method 200 may use more than two thresholds. For example, method 200 may be implemented using three, four, or more thresholds.

Figure 3:
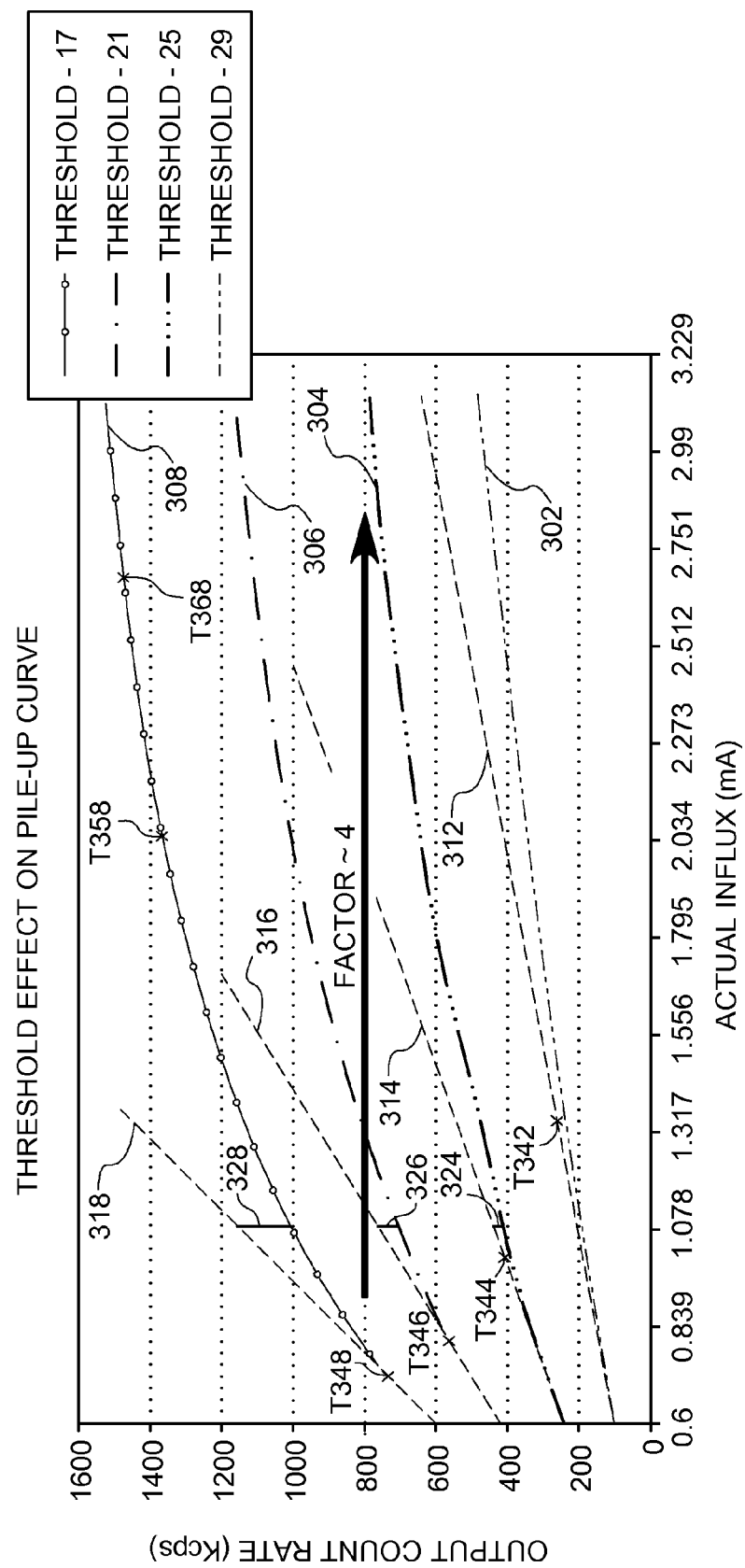
FIG. 3 is a graphical illustration of exemplary pile-up corrections that may be implemented in accordance with various embodiments of the present invention.

FIG. 3 is a graphical illustration of an exemplary pile-up correction that may be implemented using the results received from the counters described above wherein the y-axis represents the count rate or counts output by a single detector array pixel and the x-axis represents the flux rate input to the detector pixel. As will be appreciated, the count rate embodies the number of photons detected by a pixel with an associated area per unit time. Moreover, an optimal photon counting detector, such as the detector array 160, includes two behaviors: sensitivity which accounts for a noticeable change of count rate per as small as possible influx changes; and linearity which accounts for a linear change of count rate to a linear change of influx. For example, if the influx is doubled, the count rate is also doubled. In the exemplary embodiment, described herein, the linearity of the count rate may be corrected based on the sensitivity. If a noticeable change exists per flux, e.g. there is a noticeable change in the sensitivity, the method described herein is utilized to return the count rate to an approximately linear response.

For example, referring again to FIG. 3, line 302 depicts the actual count rate generated using a first counter of one photon counting pixel. Line 304 depicts the actual count rate generated using a second counter of one photon counting pixel. Line 306 depicts the actual count rate generated using a third counter of one photon counting pixel. Line 308 depicts the actual count rate generated using a fourth counter of one photon counting pixel. It should be realized that the detector array 160 may include two or more counters as discussed above. For example, the line 302 may generated by the counter 126 and the line 308 may be generated by the counter 128. Moreover, the lines 304 and 306 may be generated by additional counters not shown in FIG. 1.

In the exemplary embodiment, the line 312 represents a desirable response curve of the actual counts recorded by a counter illustrated by line 302. In the exemplary embodiment, the line 312 should be approximately linear indicating that the detector array is counting events across multiple flux spectrums. The line 314 represents a desirable response curve of the actual counts recorded by a counter illustrated by line 304. The line 316 represents a desirable response curve of the actual counts recorded by the counter illustrated at line 306. The line 318 represents a desirable response curve of the actual counts recorded by the counter illustrated at line 308.

As discussed above, in the exemplary embodiment, the linearity of the count rate may be corrected based on the sensitivity of the photon count. If a noticeable change exists, e.g. point 328, between the actual count rate, shown at line 308, and the idealized count rate, shown at line 318, a simple pile-up correction may be performed to adjust the actual count rate back to a linear response.

For example, as shown in FIG. 3, assume that line 308 depicts the actual count rate given from a low threshold counter of one photon counting pixel. From point 0 to point T348 the detector is the most sensitive, i.e. the line 308 is approximately linear and therefore approximately matches the ideal response curve 318. From points T348 to point T358, the detector is less sensitive to flux indicating that a pile-up condition has occurred and there is less increase of count rate per increase in flux. However, the sensitivity between points T348 to point T358 is still better than the sensitivity of line 302. Therefore, the information from the counter from point T348 to point T358 is still used. From points T358 to point T368 on line 308, the response is substantially similar to the response illustrated on line 302. Moreover, from point T368 to the end of line 308 the response is substantially flat indicating that no further useful count information is used from the line 308. More specifically, from point T368 to the end of line 308 changes in count rate are a poor estimation of actual flux due to the loss of sensitivity—substantial changes in the flux rate are indicated by very small changes in count rate of the counter.

Each counter has a certain range of flux where it is the most sensitive counter—i.e displays a better response in count rate to changes in flux at that range than the other counters. During operation, the pileup effect causes the detector to drop from a linear response by an ever-growing factor. The actual result is a loss of sensitivity, i.e. changes in the influx result in small changes in count rate. As the influx increases the pileup factor increases while the count rate becomes less and less sensitive, resulting in an inaccurate results. Therefore, in the exemplary embodiment, in order to achieve optimum results, at least two thresholds are used to compensate for each other's behavior: More specifically, in a low influx area, such as line 308 between points 0 and T358, a first or low threshold counter is used since this counter provides the maximum sensitivity while maintaining a manageable linear response. However, when the first counter is operating in a high influx area, e.g. between points T358 and the end of the line 308, the first or low threshold counter loses sensitivity, therefore a second counter with higher threshold is utilized either separately or in conjunction with the first counter.

Although the exemplary embodiment is described with respect to using two counters and two thresholds, it should be realized that in other embodiments, three or more counters may be utilized. For example, in the exemplary embodiment, the two counters generating the count information for lines 302 and 308 are described. However, improved results may be achieved using more than two thresholds that are derived using additional information from the lines 304 and 306, for example. Utilizing two or more thresholds effectively dissects the influx range to achieve the best sensitivity and therefore the most accurate results.

In the exemplary embodiment, the correction algorithm is applied per pixel per measurement. The following is an example of one such correction algorithm that may be applied using two thresholds counters wherein the line 308 represents the counts obtained from a first or low threshold counter C1 and the line 302 represents the counts obtained from a second or high threshold counter C2. As discussed above, more than two threshold counters may be utilized to improve the sensitivity of the counts detected.

Table 1, shown below, illustrates the exemplary method of utilizing at least two threshold counters to calculate a pile-up estimate. Let X[i] denote the estimated InFlux according to a count rate. The pileup correction performed per readout of a pixel can be as follows:

When the low-threshold counter C1 is between point T34 and point T358 the response is no longer linear, however, good sensitivity is still maintained so a pileup correction can be done accurately using the count information from the low-threshold counter C1.

However, from point T358 to point T368, the pile-up effect if is becoming substantial and accuracy is harder to obtain. Therefore, the pile-up correction is determined using both the low-threshold counter and the high-threshold counter to provide a smooth transition for the pile-up correction. In the exemplary embodiment, the pile-up correction from point T358 to point T368 is determined in accordance with:

$$InFlux = X[C1] + \frac{(X[C1] - X[T358]) * (X[C2] - X[C1])}{X[T368] - X[T358]}$$

Where X[i] denotes the estimated InFlux:
X[C1] denotes the estimated InFlux recorded by the low-threshold counter;
X[C2] denotes the estimated InFlux recorded by the high-threshold counter;
X[T358] denotes the estimated InFlux recorded by the low-threshold counter at point T358; and
X[T368] denotes the estimated InFlux recorded by the low-threshold counter at point T368.

When the low-threshold counter is no longer responsive to changes I the flux rate, e.g. from point T368 to the end of line 308, the count rate from the high-threshold counter, e.g. line 302 is used for the pile-up correction since the high-threshold counter is more accurate and sensitive to flux changes than the low-threshold counter.

TABLE 1

| Low threshold condition | Action | Formula |
| --- | --- | --- |
| C1 < T348 | Response is linear so InFlux can be calculated very accurately. | InFlux = X[Cl] |
| T348 < C1 >= T358 | Response is no longer linear. However good sensitivity is still maintained so a pileup correction can be done accurately enough. | InFlux = X[Cl] |
| T358 < C1 >= T368 | Pileup effect is becoming substantial and accuracy is harder to obtain. Use Cl to evaluate in-flux[1] and C2 to evaluate in-flux[2]: | $InFlux = X[C1] + \frac{(X[C1] - X[T358]) * (X[C2] - X[C1])}{X[T368] - X[T358]}$ |
| C1 > T368 | Use C2 to do the pileup correction and estimate InFlux more accurately. | InFlux = X[C2] |

As shown in Table 1 above, when the low-threshold counter C1 is recording information between point 0 and point T348 on line 308, the counter is substantially linear and sensitive in relation to changes in the flux and therefore the counter is the most sensitive to detector counts. Therefore, the count information between point 0 and point T348 for the low-threshold counter C1 is used to calculate the pile-up correction.

As shown in Table 1, an improved pile-up correction may be achieved using a low-threshold counter in a low flux area, and a high-threshold counter in a high flux area thereby providing the maximum sensitivity while maintaining a manageable linear response. It should be realized that in a relatively high influx area, where the high threshold counter loses sensitivity, the high-threshold counter may be used in conjunction with the low-threshold counter to maintain sensitivity.

Referring again to FIG. 2, at 214, the multiplexer 130 reads the count data output from the first counter 126, the second counter 128, and the nth counter respectively, and transfers the count data to the readout bus 132. The counters 126 . . . n are then reset to zero after being read. The readout bus 132 then transfers the data to a workstation. At 216, the data received from the readout bus 132 is input into a table (not shown) to perform the pile-up correction. For example, when the count rate is lower than the maximum corrected value, (about 80% of the maximum count rate defined by T, the dead time), the low threshold counter $T_1$ is used for the pile-up correction. When the count rate is higher than the maximum corrected value, the high threshold counter $T_2$ values are be used with the $T_2$ values to perform pile-up correction.

In the exemplary embodiments, the method 100 may be utilized to calibrate an imaging system or the method 100 may be used while imaging a patient. In one embodiment, during a calibration procedure, the flux rate of the source 162 may be gradually increased to facilitate identifying a point at which the pixel experiences saturation. The look-up table may then be amended to reflect this threshold, e.g. the second threshold $T_2$. It should also be realized that a separate threshold $T_2$ may be determined for each pixel in the detector array 160.

A technical effect of the various embodiments described herein is to provide an ability to extend the counting capability of an exemplary detector array. More specifically, multiple counters are used such that at least one additional counter counts all the events after the first counter is saturated. In this manner, the various embodiments utilize at least one additional counter to count events have a first counter has experienced a pile-up condition. The counts from the second counter may then be used to correct the information generated by the first counter. More specifically, during a CT acquisition for example, performed in a photon-counting mode, an electronics channel connected to each pixel, counts the photons with energy higher than the low threshold value. Moreover, photons with energy higher than the high threshold value are counted concurrently by a second counter. When the count rate is lower than the maximum corrected value, (about 80% than the maximal count rate defined by T, the dead time), the low threshold counter $T_1$ is used. When the count rate is higher than the maximal corrected value, the high threshold counter values $T_2$ are be used. The counter values are input to a correction table are created and used to generate the pile-up estimate. As a result, the photon-counting device described provides improved sensitivity to events at low count rate while still outputting accurate results at high-count rates. This capability enables imaging systems to utilize a CZT detector array where different count-rates may be encountered, like X-ray scans or CT scans.

Figure 4:
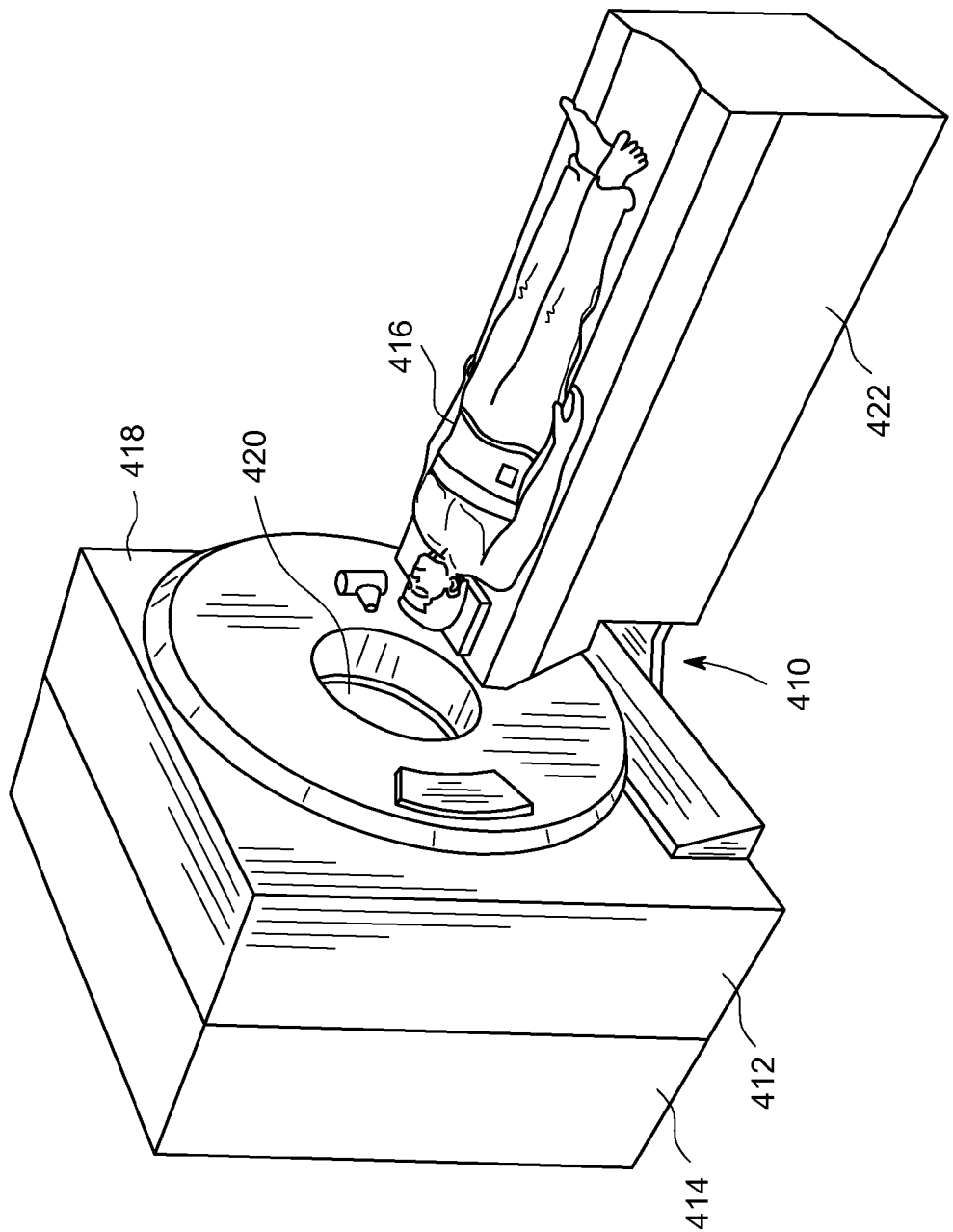
FIG. 4 is a pictorial view of an exemplary multi-modality imaging system formed in accordance with various embodiments of the present invention.

FIG. 4 is an exemplary multi-modality imaging system 410 that may include the exemplary photon-counting device 100 described above. The imaging system 410 includes a first modality unit 412 and a second modality unit 414. The two modality units enable the multi-modality imaging system 410 to scan an object or patient, such as an object 416 in a first modality using the first modality unit 412 and to scan the object 416 in a second modality using the second modality unit 414. The multi-modality imaging system 410 allows for multiple scans in different modalities to facilitate an increased diagnostic capability over single modality systems. In one embodiment, first modality unit 412 is a Computed Tomography (CT) imaging system and the second modality unit 414 is a Positron Emission Tomography (PET) imaging system. The CT/PET system 410 is shown as including a gantry 418. During operation, the object 416 is positioned within a central opening 420, defined through the imaging system 410, using, for example, a motorized table 422. The gantry 418 includes the x-ray source 162 that projects a beam of x-rays toward the detector array 160 on the opposite side of the gantry 418. The photons detected by the detector array 160 are used to reconstruct and image of the object 416.

Figure 5:
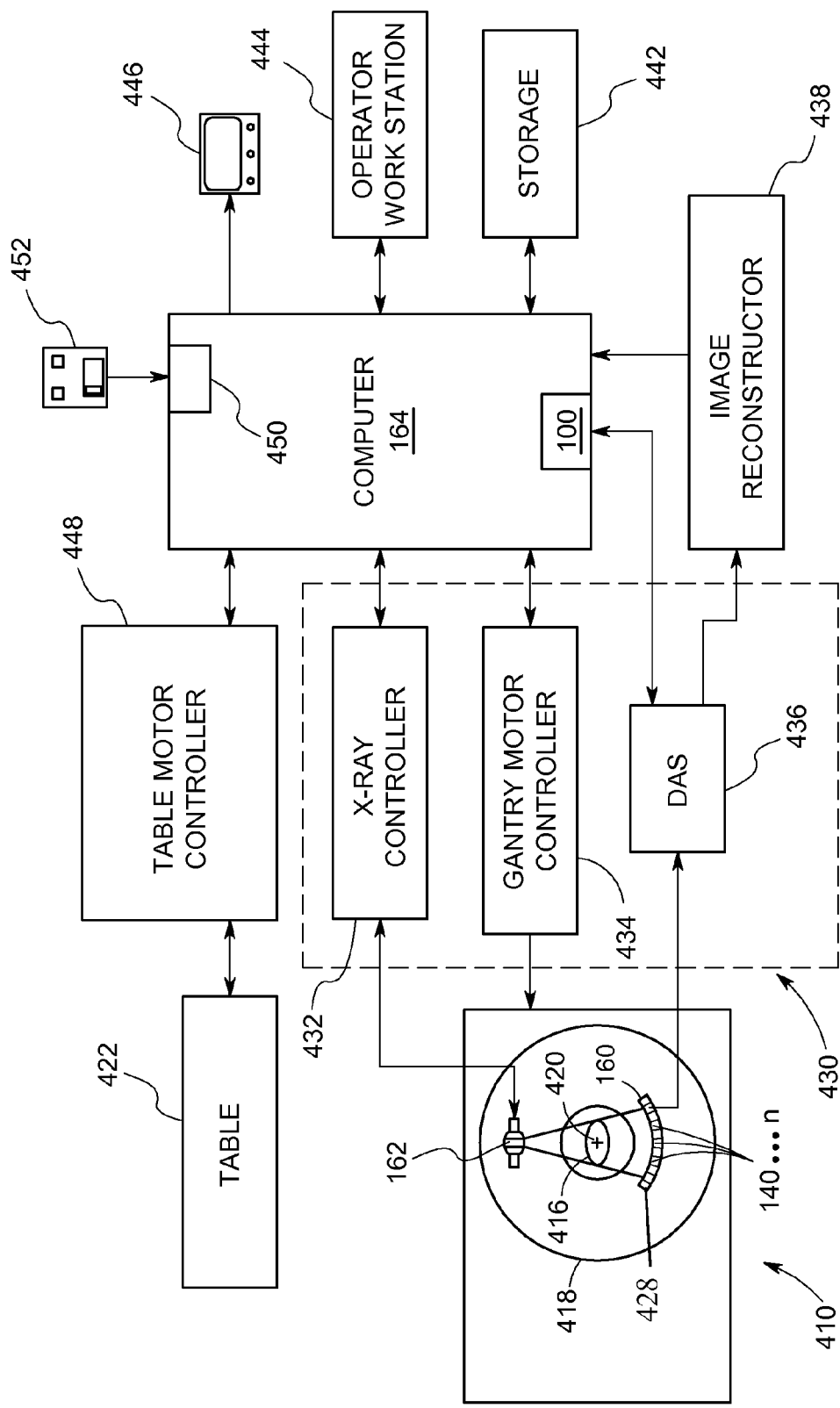
FIG. 5 is a block schematic diagram of the exemplary imaging system shown in FIG. 4 formed in accordance with various embodiments of the present invention.

FIG. 5 is a block schematic diagram of a portion of the exemplary CT imaging system 412 illustrated in FIG. 4. In this embodiment, the CT imaging system 412 includes the detector array 160. Although the detector array 160 is illustrated as having a single row of detector elements 428, it should be realized that in the exemplary embodiment, the detector array 160 is a multislice detector array that includes a plurality of parallel detector rows of detector elements 428 such that projection data corresponding to a plurality of quasi-parallel or parallel slices can be acquired at the same time during a scan. Moreover, in the exemplary embodiment, the detector array 160 may be formed of a matrix of detector elements 428 formed of a solid state material such as CZT or a matrix of scintillation crystals each associated with a solid state photo-detector such as PIN or APD (Avalanche Photo Diode). Solid state materials such as CZT are sensitive to and capable of discriminating between transmission X-ray photons and emission gamma photons.

During operation, a control mechanism 430 controls the rotation of the detector array 160 and the operation of the X-ray source 162. The control mechanism 430 includes an X-ray controller 432 that provides power and timing signals to the X-ray source 162. The control mechanism 430 also includes a gantry motor controller 434 that controls the rotational speed and position of the gantry 418. A data acquisition system (DAS) 436 in control mechanism 430 samples analog data from the detector elements 428 and converts the data to digital signals for subsequent processing using the photon-counter 100 shown in FIG. 1. In the exemplary embodiment, the CT imaging system 410 is configured to operate in either a current mode or a photon-counting mode. When operating in the current mode, the detector array 160 is configured to convert radiographic energy transmitted from the X-ray source 162 into current signals that are integrated over a time period, then measured and ultimately digitized. When operating in the photon-counting mode, the detector array 160 is configured to perform x-ray counting and also provide a measurement of the energy level of each x-ray detected.

The imaging system 410 also includes an image reconstructor 438 that receives the data generated by the photon-counting device 100 from the DAS 436 and performs high-speed image reconstruction. As used herein, the term "computer" may include any processor-based or microprocessor-based system including systems using microcontrollers, reduced instruction set computers (RISC), application specific integrated circuits (ASICs), field programmable gate array (FPGAs), logic circuits, and any other circuit or processor capable of executing the functions described herein. The above examples are exemplary only, and are thus not intended to limit in any way the definition and/or meaning of the term "computer". In the exemplary embodiment, the computer 164 executes a set of instructions that are stored in one or more storage elements or memories, in order to process input data. The storage elements may also store data or other information as desired or needed. The storage element may be in the form of an information source or a physical memory element within the computer 164. Optionally, the imaging system 410 may include an external storage device 442.

During operation, the computer 164 receives commands and scanning parameters from an operator via an operator workstation console 444 that has a keyboard. An associated display 446 enables the operator to observe the reconstructed image and other data from the computer 164 and/or the workstation 444. The operator supplied commands and parameters are used by the computer 164 to provide control signals and information to the DAS 436, the X-ray controller 432 and the gantry motor controller 434. In addition, the computer 164 operates a table motor controller 448 which controls the motorized table 422 to position the object 416, such as a patient, in the gantry 418.

In one embodiment, the computer 164 includes a device 450, for example, a floppy disk drive or CD-ROM drive, for reading instructions and/or data from a computer-readable medium 452, such as a floppy disk or CD-ROM. In another embodiment, the computer 164 executes instructions stored in firmware (not shown). The computer 164 is programmed to perform functions described herein. Although the herein described methods and devices are described in a medical setting, it is contemplated that the benefits of the methods and devices described herein accrue to non-medical imaging systems such as those systems typically employed in an industrial setting or a transportation setting, such as, for example, but not limited to, a baggage scanning system for an airport, other transportation centers, government buildings, office buildings, and the like.

The methods described herein may be implemented as a set of instructions that include various commands that instruct the computer or processor 164 as a processing machine to perform specific operations such as the methods and processes of the various embodiments described herein. For example, the method 100 may be implemented as a set of instructions in the form of a software program. As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program. For example, the photon-counting device 100 and/or the method 200 may be implemented as an algorithm. The algorithm may be stored on the computer readable medium 452 as a set of instructions. Optionally, the algorithm may be stored as a set of instructions on the computer 164.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. For example, the ordering of steps recited in a method need not be performed in a particular order unless explicitly stated or implicitly required (e.g., one step requires the results or a product of a previous step to be available). Many other embodiments will be apparent to those of skill in the art upon reviewing and understanding the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for acquiring photon count information, said method comprising:
receiving photons at a detector array having a plurality of pixels;
determining a corrected value for the detector array;
counting the photons that are above a first energy threshold using a first counter;
counting the photons that are above a different second energy threshold that is higher than the first energy threshold using a second counter; and
calculating a pile-up estimate using the photon counts from the first counter when the photon counts from the first counter are less than the corrected value or the photon counts from the second counter and not the first counter when the photon counts from the first counter are equal to or greater than the corrected value, wherein the corrected value is a value within a predetermined amount of a maximum count rate for the detector array, wherein the maximum count rate corresponds to a value at which the pixels experience saturation.

2. A method in accordance with claim 1 further comprising:
counting photons having a flux energy that is equal to or greater than approximately 40 kEv using the first counter; and
counting photons having a flux energy that is equal to or greater than approximately 100 keV using the second counter.

3. A method in accordance with claim 1 further comprising:
increasing the flux energy being detected by the detector array to a first flux level that is sufficient to substantially saturate the first counter;
increasing the flux energy being detected by the detector array to a second flux level that is greater than the first flux level;
counting photons received at the detector array using the second counter after the first counter is saturated;
calibrating the detector array using the photons counted by the first and second counters.

4. A method in accordance with claim 3 further comprising:
identifying when the photons being counted by the first counter shifts from a substantially linear response to a substantially non-linear response; and
counting photons received at the detector array using the second counter after the first counter shifts from a substantially linear response to a substantially non-linear response.

5. A method in accordance with claim 1 further comprising concurrently counting the photons received from the detector array using the first and second counters.

6. A method in accordance with claim 1, wherein the corrected value is greater than the maximum count rate.

7. A detector array comprising:
a plurality of solid state crystals forming a matrix of pixels and having a radiation detection field for sensing radiation events; and
a photon-counting device coupled to at least one of the plurality of pixels, the photon-counting device configured to
count photons received at the detector array that are above a first energy threshold using a first counter;
count photons received at the detector array that are above a different second energy threshold that is higher than the first energy threshold using a second counter; and
calculate a pile-up estimate using the photon counts from the first counter when the photon counts from the first counter are less than a corrected value of the detector array or the photon counts from the second counter and not the first counter when the photon counts from the first counter are equal to or greater than the corrected value, wherein the corrected value is a value within a predetermined amount of a maximum count rate for the detector array, wherein the maximum count rate corresponds to a value at which the pixels experience saturation.

8. A detector array in accordance with claim 7 wherein the photon-counting device is further configured to:
threshold analyze each radiation event; and
count each radiation event by comparing an energy level associated with the radiation event to a predetermined threshold.

9. A detector array in accordance with claim 7 wherein the photon-counting device is further configured to:
count photons having a flux energy that is equal to or greater than approximately 40 kEv using the first counter; and
count photons having a flux energy that is equal to or greater than approximately 100 keV using the second counter.

10. A detector array in accordance with claim 7 wherein the photon-counting device is further configured to count photons received at the detector array using the second counter after the first counter is saturated.

11. A detector array in accordance with claim 7 wherein the photon-counting device is further configured to:
identify when the photons being counted by the first counter shifts from a substantially linear response to a substantially non-linear response; and
count photons received at the detector array using the second counter after the first counter shifts from a substantially linear response to a substantially non-linear response.

12. A detector array in accordance with claim 7 wherein the photon-counting device is further configured to concurrently count the photons received from the detector array using the first and second counters.

13. A non-transitory computer readable medium including instructions to instruct a computer to:
count photons received at the detector array that are above a first energy threshold using a first counter;
count photons received at the detector array that are above a different second energy threshold that is higher than the first energy threshold using a second counter; and
calculate a pile-up estimate using the photon counts from the first counter when the photon counts from the first counter are less than the corrected value or the photon counts from the second counter and not the first counter when the photon counts from the first counter are equal to or greater than the corrected value, wherein the maximum corrected value is a value within a predetermined amount of a maximum count rate for the detector array, wherein the maximum count rate corresponds to a value at which pixels experience saturation.

14. A non-transitory computer readable medium in accordance with claim 13 wherein the instructions further instruct the computer to:
threshold analyze each radiation event; and
count each radiation event by comparing an energy level associated with the radiation event to a predetermined threshold.

15. A non-transitory computer readable medium in accordance with claim 14 wherein the instructions further instruct the computer to:
identify when the photons being counted by the first counter shifts from a substantially linear response to a substantially non-linear response; and
count photons received at the detector array using the second counter after the first counter shifts from a substantially linear response to a substantially non-linear response.

16. A method for acquiring photon count information, said method comprising:
receiving photons at a detector array having a plurality of pixels;
determining a corrected value for the detector array based upon a value at which the pixels experience saturation;
counting the photons that are above a first energy threshold using a first counter;
counting the photons that are above a different second energy threshold using a second counter; and
calculating a pile-up estimate using the photon counts from only the first counter when the photon counts from the first counter are below a first threshold, using the photon counts from the first counter and the second counter when the photon counts from the first counter are above the first threshold but below a second threshold, and using the photon counts from only the second counter when the photon counts from the first counter are above the second threshold, wherein the second threshold is set at the corrected value, wherein the corrected value is within a predetermined amount of a maximum count rate corresponding to the value at which the pixels experience saturation.

17. A method for acquiring photon count information, said method comprising:
receiving photons at a detector array having a plurality of pixels;
determining a maximum corrected value for the detector array, wherein the maximum corrected value is equal to 80% of the maximum count rate for the detector array;
counting the photons that are above a first energy threshold using a first counter;
counting the photons that are above a different second energy threshold using a second counter; and
calculating a pile-up estimate using the photon counts from the first counter when the photon counts from the first counter are less than the maximum corrected value or the photon counts from the second counter when the photon counts from the second counter are equal to or greater than the maximum corrected value.

* * * * *